US011639272B2

(12) United States Patent
Alessio

(10) Patent No.: US 11,639,272 B2
(45) Date of Patent: May 2, 2023

(54) SORTING DEVICE AND SYSTEM FOR ITEMS WITH IRREGULAR SHAPE AND SIZES

(71) Applicant: OCM S.p.A., Mezzano Inferiore (IT)

(72) Inventor: Giuseppe Alessio, Turin (IT)

(73) Assignee: Material Handling Systems, Inc., Mt. Washington, KY (US)

( * ) Notice: Subject to any disclaimer, the term of this patent is extended or adjusted under 35 U.S.C. 154(b) by 119 days.

(21) Appl. No.: 17/182,802

(22) Filed: Feb. 23, 2021

(65) Prior Publication Data

US 2021/0269250 A1    Sep. 2, 2021

(30) Foreign Application Priority Data

Feb. 27, 2020 (IT) .......................... 102020000004120

(51) Int. Cl.
*B65G 39/16* (2006.01)
*B07C 5/36* (2006.01)

(52) U.S. Cl.
CPC ................ *B65G 39/16* (2013.01); *B07C 5/36* (2013.01); *B65G 2201/04* (2013.01); *B65G 2207/36* (2013.01)

(58) Field of Classification Search
CPC ........................... B65G 39/16; B65G 2201/04; B65G 2207/36; B65G 29/00; B65G 47/80; B65G 47/1457; B07C 5/36; B07C 3/08
See application file for complete search history.

(56) References Cited

U.S. PATENT DOCUMENTS 3,295,660 A  *  1/1967  Nelson .................. B65G 47/80
198/414

FOREIGN PATENT DOCUMENTS

| JP | 7-149428 A | 6/1995 |
| JP | H07330143 A | * 12/1995 |
| KR | 10-1992418 B1 | 6/2019 |

OTHER PUBLICATIONS

Machine translation of JP-H07330143-A (Year: 1995).*

* cited by examiner

*Primary Examiner* — Michael McCullough
*Assistant Examiner* — Jessica L Burkman
(74) *Attorney, Agent, or Firm* — Stites & Harbison, PLLC; David W. Nagle, Jr.; Gary N. Stewart

(57) ABSTRACT

A sorting device for packages includes a fifth wheel mounted on a support structure and rotatable around a vertical axis; a conveyor belt mounted on the fifth wheel and able to rotate therewith about the vertical axis; and at least one sliding surface placed below the plane of the conveyor belt, to close the openings which, during the rotation of the fifth wheel and of the conveyor belt around the vertical axis, are created between the sorting device and the conveyor belts adjacent to it.

10 Claims, 3 Drawing Sheets

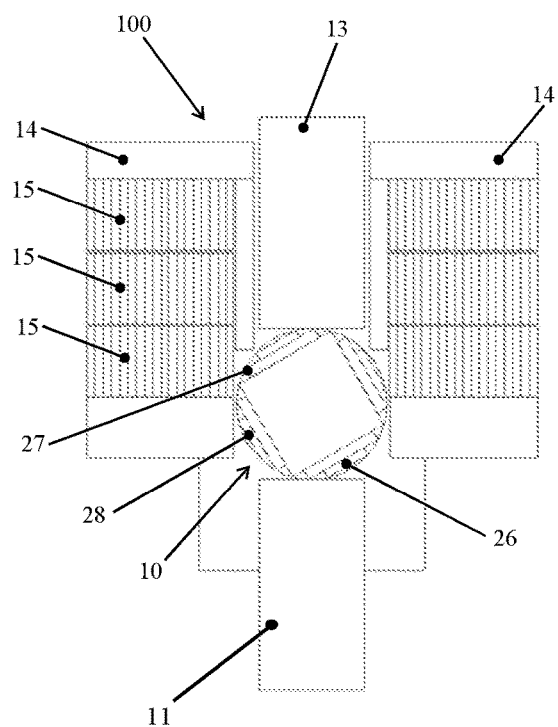
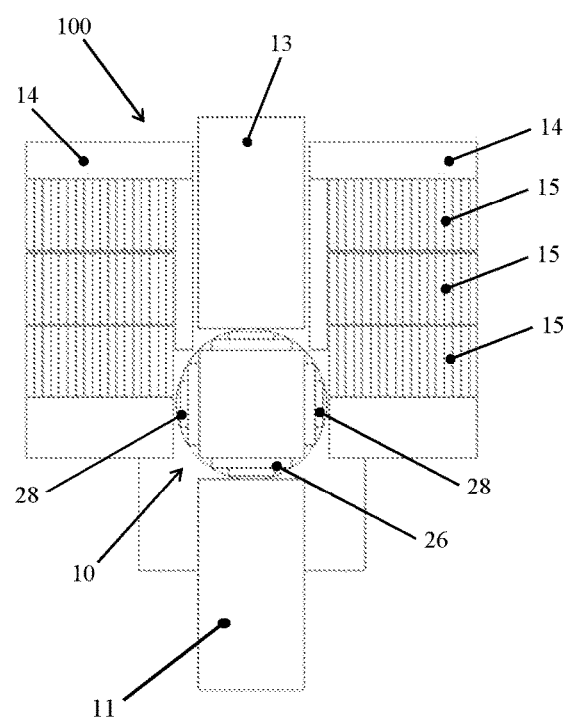
FIG. 1                    FIG. 2

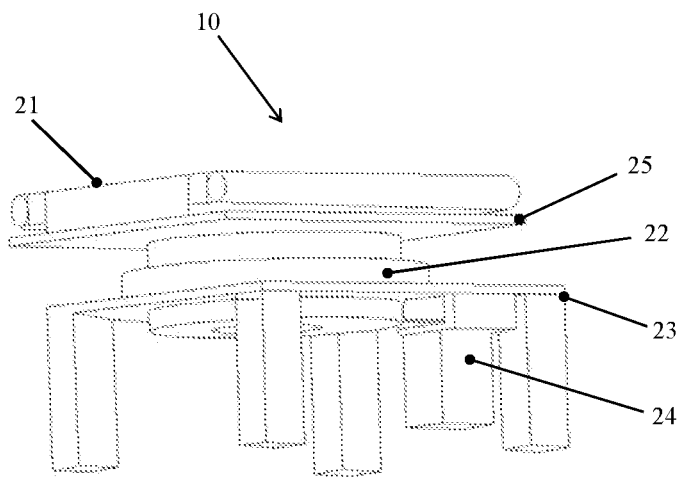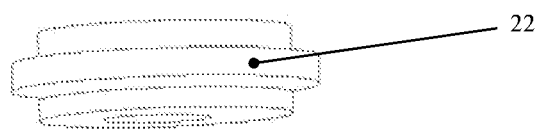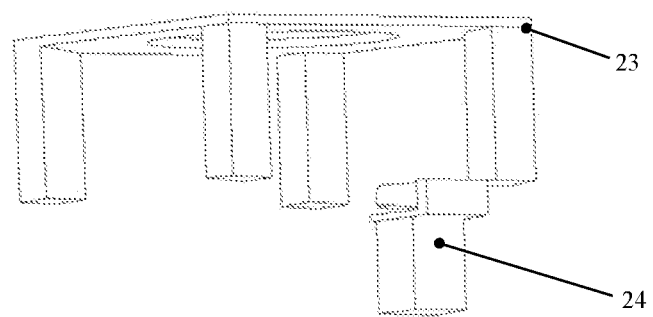
FIG. 3

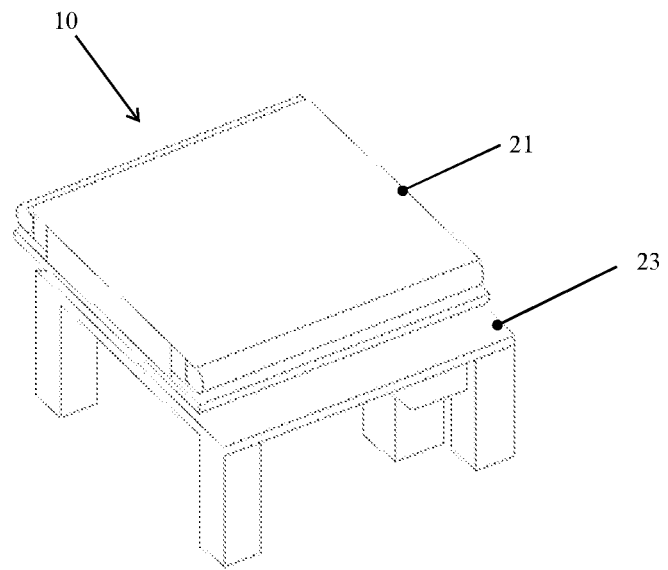
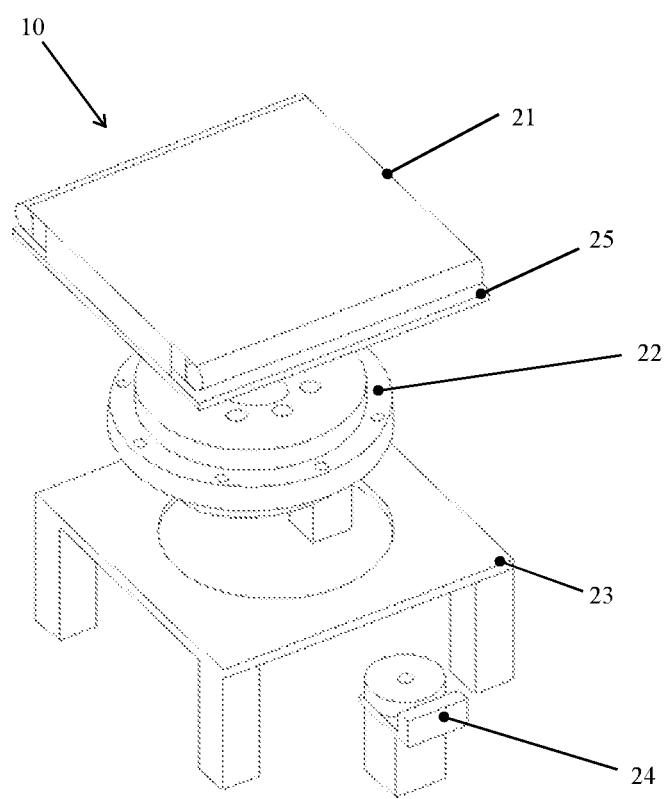
FIG. 4

SORTING DEVICE AND SYSTEM FOR ITEMS WITH IRREGULAR SHAPE AND SIZES

BACKGROUND IN THE INVENTION

1) Field of the Invention

The present invention relates to a device and a sorting system for parcels with irregular shape and size.

In particular, the invention relates to a sorting device for the selective deviation of packages towards the stack accumulation outlets, inserted in a conveying system with conveyor belts.

2) Background Art

Devices for the selective deviation of packages are known in the art, and comprise a conveyor belt rotatably mounted on a fifth wheel, rotated by a motor controlled by a control system.

However, these devices are not satisfactory and have the following problems.

A first problem is caused by the fact that, during the rotation of the fifth wheel, areas are created between the rotating conveyor belt mounted on the fifth wheel and the adjacent fixed wheel in which the distance between the belts increases, with the consequent formation of openings that could cause it to stumble over the packages.

A second problem arises when any thin moving part of the package packaging is dragged by the belt against fixed parts that are in front of the belt, creating a possible joint.

Documents JP-A-H07 149428 and KR-B1-101 992 418 describe prior art sorting devices.

SUMMARY OF THE INVENTION

Object of the present invention is solving the aforesaid prior art problems by providing a sorting device for packages of irregular shape and size.

A further object of the present invention is providing a sorting system comprising the above mentioned sorting device.

The aforesaid and other objects and advantages of the invention, as will appear from the following description, are achieved with a sorting device such as that described in claim 1. Preferred embodiments and non-trivial variations of the present invention are the subject of the dependent claims.

It is understood that the attached claims are an integral part of this description.

BRIEF DESCRIPTION OF THE DRAWINGS

The present invention will be better described by some preferred embodiments, provided by way of non-limiting example, with reference to the attached drawings, in which:

FIG. 1 is a top view of a first configuration of a sorting device and of a sorting system according to the present invention;

FIG. 2 is a top view of a second configuration of a sorting device and of a sorting system according to the present invention;

FIG. 3 is a perspective view of a sorting device according to the present invention; and FIG. 4 is an exploded view of a sorting device according to the present invention.

DETAILED DESCRIPTION OF PREFERRED EMBODIMENTS

With reference to the Figures, a preferred embodiment of the sorting device 10 and of the sorting system 100 for packages of irregular shape and size of the present invention is shown and described. It will be immediately obvious that innumerable variations and modifications (for example relating to shape, size, various colors and parts with equivalent functionality) can be made to the sorting device 10 and to the sorting system 100 without departing from the scope of the invention as appears from the attached claims.

The sorting system 100 for packages of the invention comprises a loading section or station 11, a sorting device 10 called "Skew Belt" and arranged downstream of the loading section 11, and an advancement section 13 arranged downstream of the device sorting system 10 in the advancement direction of the pack or package on the sorting system 100.

The sorting system 100 further comprises at least one outlet section 14; preferably the sorting system 100 of the invention comprises two outlet sections 14, consisting for example of roller conveyors 15 arranged on two opposite sides of the feed section 13 and of the sorting device 10.

The loading section 11 and the feeding section 13 each comprise at least one conveyor belt.

Preferably, the roller conveyors 15 are arranged transversely to the conveyor belt of the advancement section 13, more preferably they are perpendicular to the conveyor belt of the advancement section 13.

The sorting device 10 shown in the figures comprises one or more conveyor belts 21 mounted on a fifth wheel (or wheel) 22; the fifth wheel 22 is mounted on a support structure 23 and can be rotated around a vertical axis preferably with a rotation of at least +/−45 degrees.

In one embodiment, the sorting device 10 of the invention comprises a conveyor belt 21 or three or more conveyor belts 21 in parallel, actuated for example by an electric motor 24.

In a second embodiment, the sorting device 10 of the invention comprises three or more conveyor belts 21 in parallel, actuated for example by motors 24 having the same speed or driven by a single gear-motor with known solutions for the transmission of the torque, in order to increase the driving surface.

The sorting device 10 of the invention preferably comprises at least one or more low-friction sliding planes 25 placed under the plane of the conveyor belt 21, preferably a few millimeters away from it, to close the openings which during the rotation around the vertical axis of the fifth wheel 22 and of the conveyor belt 21 are created between the sorting device 10 and the conveyor belts adjacent thereto.

In particular, the one or more low-friction sliding planes 25 are able to close the openings that are created between the sorting device 10 and the conveyor belt of the feed section 13 or that are created between the device sorting machine 10 and the roller conveyors 15 of the outlet sections 14.

The sorting system 100 comprises a control system for controlling the rotation of the fifth wheel and therewith of the conveyor belt 21 and of the low friction sliding surfaces 25, and a gear-motor controlled for example by a positioning servo-control, or by other known actuation solutions, which is connected to the fifth wheel and puts it in rotation.

Preferably, the sorting device 10 according to the invention comprises loading rollers 26, feed rollers 27 and exit rollers 28 shown in FIGS. 1 and 2, which can be idle and/or motored.

Preferably, the sorting device 10 comprises at least one roller 26, 27, 28 connected to the fifth wheel 22, facing one of the four sides of the conveyor belt 21 and with its axis parallel to the side.

The loading rollers 26 are arranged in the part of the sorting device 10 which faces the loading section 11 and are motorized rollers able to rotate in the same direction as the conveyor belt 21.

The feed rollers 27 arranged in the part of the sorting device 10 which faces the feed section 13 are preferably non-motored idle rollers.

The output rollers 28 arranged on the sides of the sorting device 10 facing the output sections 14 can preferably be idle rollers or alternatively motored rollers, in the latter case rotating towards the output during the deflection of the pack.

The sorting system 100 also includes a motored roller 29 with a high friction coating, arranged parallel to the direction of advancement, at the entrance of the roller conveyor 15 of the outlet sections 14.

The operation of the sorting device 10 and of the sorting system 100 according to the present invention will now be described.

The sorting device 10 is inserted in a sorting system 100 comprising conveyor belts, in the positions where the selective deviation of the packs towards the outlet sections 14 of the roller conveyor 15 is necessary for the accumulation of the packs having the same destination shipping.

The figures show two positions, which can lead to a rotation of the sorting device 10 around a vertical axis by +/−45 degrees, and in particular in FIG. 1 the one in which the pack is diverted towards the outlet sections 14, and FIG. 2 the position in which the pack continues along the belt of the feeding section 13.

The rotation of the conveyor belt 21 and of the low friction sliding planes 25 on the fifth wheel takes place upon a command of the control system and is preferably performed by the gear-motor controlled by a positioning servo-control, or by other known actuation solutions.

During the rotation of the conveyor belt 21 on the fifth wheel 22, openings are created between the sorting device 10 and the conveyor belt of the feed section 13 or between the sorting device 10 and the roller conveyors 15 of the outlet sections 14.

The low-friction sliding surfaces 25 located below the surface of the conveyor belt 21 close these openings which could cause stumbling for the packs during their passage.

The loading rollers 26 arranged in the part of the sorting device 10 facing the loading section 11, motored and rotating in the same direction as the conveyor belt 21, prevent any thin moving parts of the package packaging from being dragged by the belt 21 against the parts fixed packaging that are placed in front of the belt, creating a possible joint.

The feed rollers 27 arranged in the part of the sorting device 10 which faces the feed section 13, preferably idle and not motored, have the sole function of providing low friction support for the pack pushed by the upstream conveyor belt 21, since in the part facing the advancement section 13 the conveyor belt 21 has the opposite direction of motion to that which could cause jams.

The motored roller 29 with a coating with a high friction value, arranged parallel to the advancement direction, at the entrance of the roller conveyor 15 of the outlet sections 14, has the function of exerting on the front part of the pack, during the deviation phase towards the outlet section 14, a force component parallel to the direction of the outlet so that the pack can continue its rotation towards the axis of the outlet, initiated by the sorting device 10.

Advantageously, the sorting device 10 of the invention prevents the openings between the sorting device 10 and the conveyor belt of the feed section 13 or between the sorting device 10 and the roller conveyors 15 of the outlet sections 14 from causing stumbling of parcels during their passage.

Advantageously, the rollers 26, 27, 28 facilitate the sliding of the packs and prevent the thin moving parts of the pack packaging from being dragged by the belt against fixed parts in front of the belt.

I claim:

1. A sorting device for packages comprising:
   a wheel mounted on a support structure and rotatable about a vertical axis;
   a conveyor belt mounted on the wheel and able to rotate therewith about the vertical axis; and
   at least one sliding surface placed under a plane of the conveyor belt and positioned between the wheel and the conveyor belt, wherein the at least one sliding surface is configured to close openings created between the sorting device and one or more conveyors adjacent to the sorting device while the sorting device is in use and the wheel and the conveyor belt are rotated around the vertical axis.

2. The sorting device for packages of claim 1, wherein the conveyor belt is comprised of three or more conveyor belts in parallel.

3. The sorting device for packages of claim 1, comprising at least one roller connected to the wheel, facing one of the four sides of the conveyor belt and with the axis parallel to that side.

4. The sorting device for packages of claim 3, wherein the at least one roller is a loading roller arranged in the part of the sorting device which faces a loading section of a sorting system and is a motored roller able to rotate in the same direction as the conveyor belt to prevent moving parts of the package packaging from being dragged by the belt, creating a joint.

5. The sorting device for packages of claim 3, wherein the at least one roller is a feed roller arranged in the part of the sorting device which faces a feed section of the sorting system and is a non-motored idle roller to provide support for the package pushed by the conveyor belt.

6. The sorting device for packages of claim 3, wherein the at least one roller is an exit roller arranged on the sides of the sorting device facing exit sections of the sorting system and is an idle roller or a motorized roller, in the latter case rotating towards the outlet during the deviation of the package.

7. A sorting system for packages comprising:
   a loading section for loading the packages;
   a sorting device arranged downstream of the loading section, including
      a wheel mounted on a support structure and rotatable about a vertical axis,
      a conveyor belt mounted on the wheel and able to rotate therewith about the vertical axis, and
      at least one sliding surface placed under a plane of the conveyor belt and positioned between the wheel and the conveyor belt, wherein the at least one sliding surface is configured to close openings created between the sorting device and one or more conveyors adjacent to the sorting device while the sorting device is in use and the wheel and conveyor belt are rotated around the vertical axis; and
   an advancement section arranged downstream of the sorting device in the advancement direction of the package on the sorting system.

8. The sorting system for packages of claim 7, further comprising two outlet sections, comprising roller conveyors arranged on two opposite sides of the feed section and the sorting device.

9. The sorting system for packages of claim 7, further comprising an outlet section arranged alongside the feed section and the sorting device.

10. The sorting system for packages of claim 9, further comprising a coated motored roller, arranged parallel to the advancement direction, at the entrance to the outlet section.

* * * * *